United States Patent
Meynier

(10) Patent No.: US 6,173,804 B1
(45) Date of Patent: Jan. 16, 2001

(54) SYSTEM INTENDED FOR PERMANENT INSTALLATION OF MEASURING SONDES IN A PIPE BY MEANS OF A FLUID PRESSURE-ACTUATED REMOVABLE LOCK

(75) Inventor: Patrick Meynier, rue des Garennes (FR)

(73) Assignee: Institute Francais du Petrole, Cedex (FR)

(*) Notice: Under 35 U.S.C. 154(b), the term of this patent shall be extended for 0 days.

(21) Appl. No.: 09/459,862

(22) Filed: Dec. 14, 1999

(30) Foreign Application Priority Data

Dec. 18, 1998 (FR) .................................................. 98 16089

(51) Int. Cl.[7] ...................................................... G01V 1/40
(52) U.S. Cl. .................. 181/102; 73/152.17; 166/250.11
(58) Field of Search .................... 181/101–106; 73/152.17; 166/250.11

(56) References Cited

U.S. PATENT DOCUMENTS

| | | |
|---|---|---|
| 4,578,785 | 3/1986 | Gelfand . |
| 4,616,703 | 10/1986 | Laurent . |
| 4,686,653 | 8/1987 | Staron . |
| 5,092,423 | 3/1992 | Petermann . |
| 5,111,903 | 5/1992 | Meynier . |
| 5,212,354 | 5/1993 | Miller et al. . |
| 5,801,642 | 9/1998 | Meynier . |
| 5,810,080 | * 9/1998 | Meynier ................................ 181/102 |
| 5,864,099 | * 1/1999 | Wittrisch et al. ..................... 181/102 |

FOREIGN PATENT DOCUMENTS

| | | |
|---|---|---|
| 1169871 | 1/1959 | (FR) . |
| 2656034 | 6/1991 | (FR) . |

\* cited by examiner

*Primary Examiner*—Khanh Dang
(74) *Attorney, Agent, or Firm*—Antonelli, Terry, Stout & Kraus, LLP

(57) ABSTRACT

A system intended for permanent installation of measuring sondes against the inner wall of a pipe (1) such as a well or a tube. Measuring sondes (7) are respectively associated with coupling devices (2) that are brought to their respective coupling points in the pipe by means of a tube (3) positioned by off-centering devices (4) for example. Each coupling device (2) comprises a flexible element (6) carrying sonde (7), that is deformed to a set back position where it is immobilized by a lock (9) so as to allow displacement thereof along pipe (1). In order to release flexible blades (6), a sufficient overpressure allowing to push back the piston of a jack (10) whose cylinder communicates at one end with the inside of pipe (1) is established. In this expanded position, it immobilizes coupling device (2) and presses sonde (7) against pipe (1) while mechanically decoupling it from tube (3). Tube (3) can possibly be withdrawn if it does not serve another purpose. The system can be applied to long-time (notably seismic) monitoring of an underground zone under development; the tube used for putting the sondes into place can be a production tubing.

33 Claims, 1 Drawing Sheet

SYSTEM INTENDED FOR PERMANENT INSTALLATION OF MEASURING SONDES IN A PIPE BY MEANS OF A FLUID PRESSURE-ACTUATED REMOVABLE LOCK

FIELD OF THE INVENTION

The present invention relates to a system intended for permanent installation of measuring sondes against the inner wall of pipes.

The installation system according to the invention can find application in many industries. It is notably useful for positioning various measuring sondes useful for longtime monitoring of underground zones, such as hydrocarbon reservoirs during exploration and/or production stages, or storage or burial reservoirs. The system can be used for example for installing seismic pickups (geophones, hydrophones, etc) coupled with the wall of a well for monitoring operations, whether active monitoring using a seismic source placed at the surface, in another well or possibly in the same well, or passive monitoring for detecting reactions of the zone in response to production operations carried out therein.

BACKGROUND OF THE INVENTION

It is well-known to lower seismic receivers into a well by means of a support such as a tube lowered in the well to a working depth. The receivers are placed in sondes, mobile boxes or pads secured to anchor systems suited to move on demand the receivers until they are coupled with the well wall, directly or by means of a casing pipe. The anchor systems can comprise mobile arms that can be shifted by hydraulic jacks or springs. Moving to a stretched position is performed by electric or hydraulic triggering means controlled by an operator from the surface, once the depth of installation is reached. They can also be secured to flexible blades such as tube off-centering blades and pressed against the well wall thereby.

Patent FR-A-2,656,034 (U.S. Pat. No. 5,181,565) describes a system for permanent installation, in a well, of a sonde for seismic or acoustic pickups by means of a tubular string such as a production tubing for example. The sonde (or each one of them) is associated with a system externally fastened to the string. At the operator's request, each sonde can be moved from a set back position where it is coupled with the string to a position of coupling with the well wall (or a well casing pipe) and acoustically decoupled from the string.

SUMMARY OF THE INVENTION

The system according to the invention allows installation of at least one measuring sonde against the wall of a pipe (a tube or a wellbore drilled through an underground formation for example).

The system comprises an elongate support element (a rod, a tube or a specialized tubing suited for fluid circulation for example), at least one device for coupling each sonde, comprising at least one flexible element to which the measuring sonde is fastened, this flexible element being suited, in a stretched position, to press said sonde against the wall of the pipe, and means for locking the flexible element in a set back position at a distance from the wall of the pipe, these locking means being actuated by establishing (by pumping means for example) an overpressure in the pipe.

Each coupling device comprises for example a tubular sleeve supporting each elastic element, the cross-section of this tubular sleeve being larger than that of the elongate element, the locking means comprising a lock suited to engage into a part secured to the flexible element, in a set back position thereof, and means for releasing the lock through breaking of a finger under the effect of a determined overpressure applied in the pipe.

The system can comprise means for transverse positioning of the elongate element in the pipe, so dimensioned that, in a stretched position of each elastic element, each coupling device is mechanically decoupled from the elongate element.

Each coupling device can comprise elastic damping means placed between the sleeve and the elongate element, for mechanically decoupling each measuring sonde from the elongate element when the flexible element is in a stretched position.

According to an embodiment, the unblocking means include a hydraulic jack comprising a cylinder that communicates with the inside of the pipe at a first end, the cylinder being secured to the elongate element, a mobile piston secured to the lock, sliding in the cylinder and a calibrated blocking finger that gives way when the differential pressure applied to the piston of the jack is higher than a threshold value.

The system can be used for example for installing a series of seismic sondes against the wall of a wellbore drilled through an underground zone, and it comprises in this case means for transmitting, to a surface recording station, signals picked up by the various seismic sondes. The elongate element used to lower the various coupling devices to their working depth can either be a tubing that remains in place in the well where it is used for carrying fluids (hydrocarbon production, injection of scavenging fluids, gas, substances to be stored, etc.), or a simple tube that is withdrawn once the seismic sondes are coupled with the well wall.

BRIEF DESCRIPTION OF THE DRAWINGS

Other features and advantages of the method according to the invention will be clear from reading the description hereafter of a non limitative realisation example, with reference to the accompanying drawings wherein.

DETAILED DESCRIPTION

The installation system according to the invention is suited for setting in a pipe 1 one or more devices 2 for coupling measuring sondes. In underground applications for example, pipe 1can be the wall of a wellbore drilled through a formation or possibly a conventional casing pipe cemented in the well. Coupling devices 2 are lowered all along pipe 1, to the coupling points, by means of any sufficiently rigid elongate element 3: a rod, a tube or a tubing used for transfer of fluids between the surface and the underground zone in one direction or in the opposite direction, according to applications.

Figure 1:
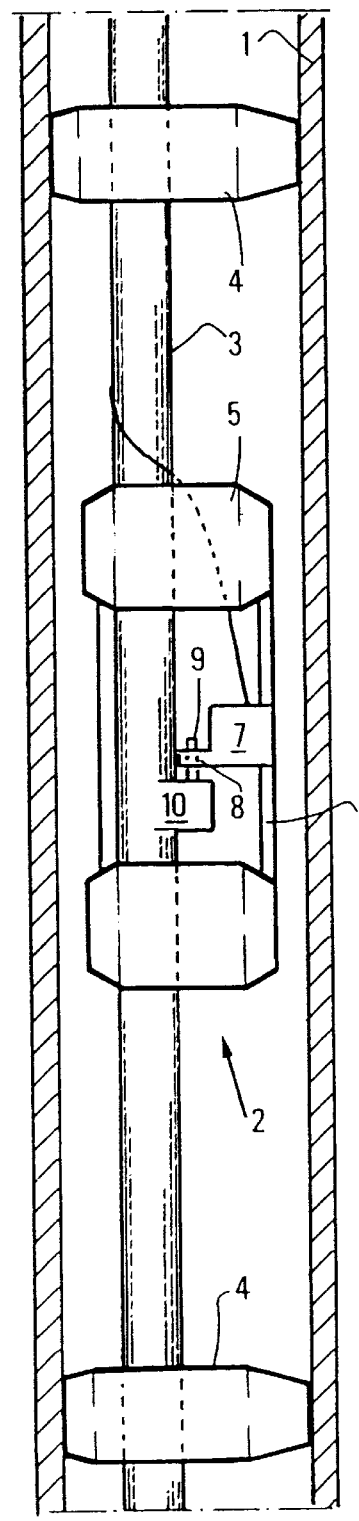
FIG. 1 diagrammatically shows a coupling device using a flexible coupling element, associated with a guide tube, shown in a set back position suited for moving a measuring sonde along a tube (FIG. 1), FIG. 2 diagrammatically shows the same coupling device in a stretched position suited for coupling the sonde with the tube wall.
Figure 2:
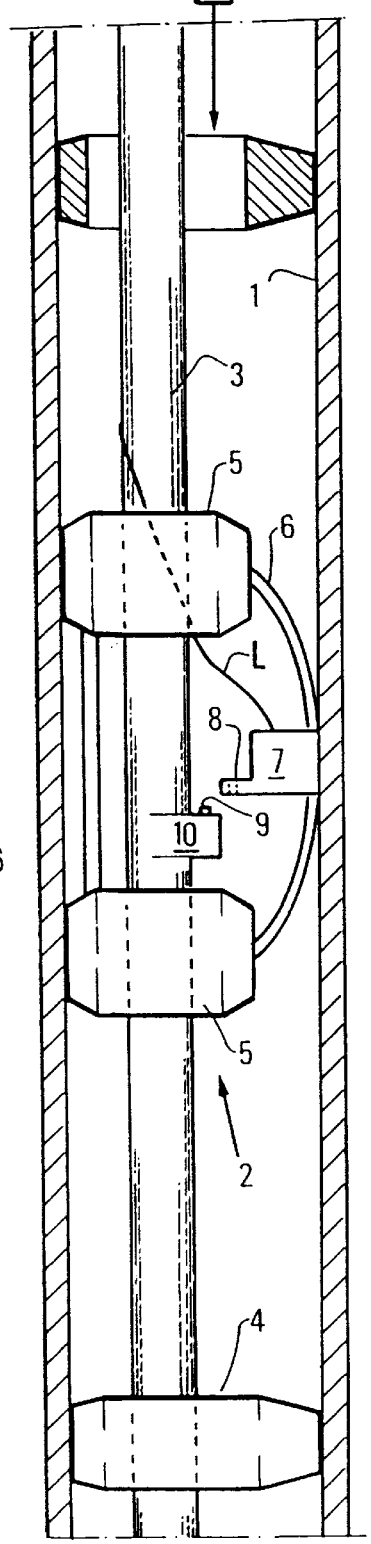

According to the embodiment of FIGS. 1, 2, elongate element 3, which is here a tube, is associated with off-centering elements 4 arranged on either side of each coupling device 2 and intended to position tube 3 in relation to pipe 1. Each coupling device 2 comprises a tubular sleeve 5 of larger section than tube 3, provided with at least one flexible element 6 such as a blade, whose opposite ends are secured to sleeve 5. In its stretched position, the flexible element is dome-shaped as shown in FIG. 2, sufficiently to rest against the wall of pipe 1 and for coupling device 2 to be immobilized. A box 7 intended for a measuring sonde is fastened to flexible element 6 in the vicinity of the supporting zone, so as to be tightly coupled with the wall of pipe 1. Box 7 comprises a finger 8 provided with a housing for a lock 9 associated with control means 10.

These control means include for example a hydraulic jack (FIGS. 3, 4) comprising a piston 11 provided with seals 12, that is secured to lock 9. It is mounted sliding in cylinder 13 secured to elongate element 3. Cylinder 13 is arranged parallel to pipe 1. Its end that is the closer to piston 11 in the position where lock 9 is engaged in finger 8 communicates with the inside of pipe 1 through an opening 14. The part of the cylinder opposite opening 14 contains a low-pressure fluid (atmospheric pressure for example).

Piston 11, in the position it occupies when lock 9 is engaged in finger 8 (FIG. 3), is held in place by a blocking snug 15 dimensioned to break when the differential pressure exerted during operation on either side of piston 11 exceeds a certain threshold.

Figure 3:
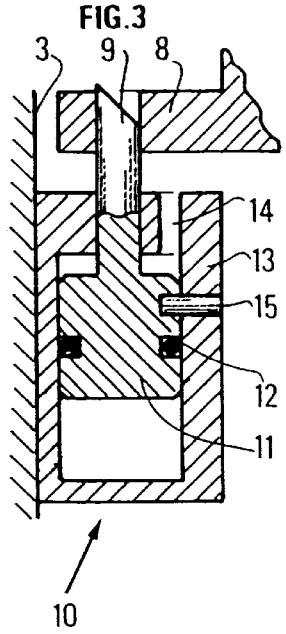
FIG. 3 shows a partial cross-section of the means allowing to lock the flexible coupling elements, in an engaged position.
Figure 4:
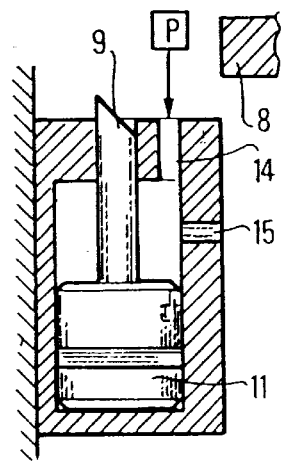
FIG. 4 shows the locking means in an unblocked position.

In order to allow free transport of coupling devices 2 to their prescribed position in pipe 1, flexible elements 6 are deformed to their set back position where locks 9 can be blocked in an engaged position, and pistons 11 blocked by fastening of blocking snugs 15 (FIG. 3). This locking makes coupling devices 2 and elongate element 3 interdependent.

When the coupling devices have reached their prescribed position in pipe 1, a sufficient overpressure is applied in pipe 1 in order to cause breaking of blocking snugs 15, backward motion of locks 9 and return of the flexible elements to their stable position in contact with the wall of pipe 1, which provides tight coupling of measuring box 7 with this wall.

Off-centering devices 14 are so dimensioned that annular sleeve 5, in the unblocked position of flexible elements 6, is substantially centred on tube 3. The measuring sonde in box 7 is therefore entirely mechanically decoupled from tube 3. This layout is particularly suited for applications in wells where tube 3 is a production tubing that is left in place for fluid transfers and where the sondes include seismic or acoustic type pickups (geophones for example) which would otherwise be sensitive to the vibrations generated during well development.

For other applications where tube 3 is not necessary any longer, it is possible to withdraw it completely, the coupling devices remaining in place and resting against the inner face of pipe 1.

According to a variant of the previous embodiment, in the absence of off-centering means 4 stabilizing the position of the tube in pipe 1, it is possible to obtain mechanical decoupling of each measuring sonde in relation to tube 3 by interposing elastic damping means (not shown) between the tube and the sleeve.

The system that has been described can be used for example to install a series of seismic sondes 7 against the wall of a wellbore 1 drilled through an underground zone, and it comprises in this case means L for transmitting signals picked up by the various seismic sondes to a surface recording station (not shown). The elongate element 3 used to lower the various coupling devices to the installation depth can be a tubing that remains in place in the well where it is used to carry fluids (hydrocarbon production, injection of scavenging fluids, gas, substances to be stored, etc.), or a simple tube that is withdrawn once the seismic sondes coupled with the well wall, as described.

An embodiment where the pressure-threshold locking finction is fulfilled by a blocking snug 15 has been described. It can however be replaced, without departing from the scope of the invention, by an equivalent means such as, for example, a calibrated ball valve of a well-known type that opens when a determined overpressure is applied.

What is claimed is:

1. A system intended for installation of at least one measuring sonde (7) against the wall of a pipe (1), comprising an elongate support element (3), at least one device (2) for coupling each sonde, comprising at least one flexible element (6) to which measuring sonde (7) is fastened, this flexible element being suited, in a stretched position, to press said sonde (7) against the wall of pipe (1), characterized in that it comprises means (8–10) for locking flexible element (6) in a set back position at a distance from the pipe wall, these locking means being suited to be actuated by establishing an overpressure in pipe (1).

2. A system as claimed in claim 1, characterized in that each coupling device (2) comprises a tubular sleeve (5) supporting each elastic element (6), the cross-section of this tubular sleeve being larger than that of elongate element (3), the locking means comprising a lock (9) suited to engage into a part (8) secured to flexible element (6), in a set back position thereof, and means for unblocking the lock under the effect of a determined overpressure applied in pipe (1).

3. A system as claimed in claim 1, characterized in that it comprises means (4) intended for transverse positioning of elongate element (3) in pipe (1), so dimensioned that, in a stretched position of each flexible element, each coupling device (2) is mechanically decoupled from elongate element (3).

4. A system as claimed in claim 1, characterized in that each coupling device (2) comprises elastic damping means arranged between sleeve (5) and elongate element (3), for mechanically decoupling each measuring sonde (7) from the elongate element in a stretched position of flexible element (6).

5. A system as claimed in claim 1, characterized in that unblocking means (10) include a hydraulic jack comprising a cylinder (13) 5 communicating with the inside of pipe (1) at a first end, the cylinder being secured to elongate element (3), a mobile piston (11) secured to lock (9), sliding in the cylinder, and a blocking snug for blocking mobile piston (11) in its position of engaging in flexible element (6), that is calibrated to give way when the differential pressure applied to the piston of the jack is higher than a threshold value.

6. A system as claimed in claim 1, characterized in that unblocking means (10) include a hydraulic jack comprising a cylinder (13) communicating with the inside of pipe (1) at one end, the cylinder being secured to elongate element (3), a mobile piston (11) secured to lock (9), sliding in cylinder (13), which communicates with the inside of the pipe through a valve calibrated to open when the overpressure in pipe (1) reaches a determined threshold value.

7. A system as claimed in claim 1, characterized in that it comprises pumping means (P) intended to establish an overpressure.

8. A system as claimed in claim 1, characterized in that elongate element (3) is a tubing suited for fluid circulation.

9. A system as claimed in claim 2, characterized in that it comprises means (4) intended for transverse positioning of elongate element (3) in pipe (1), so dimensioned that, in a stretched position of each flexible element, each coupling device (2) is mechanically decoupled from elongate element (3).

10. A system as claimed in claim 2, characterized in that each coupling device (2) comprises elastic damping means arranged between sleeve (5) and elongate element (3), for mechanically decoupling each measuring sonde (7) from the elongate element in a stretched position of flexible element (6).

11. A system as claimed in claim 2, characterized in that unblocking means (10) include a hydraulic jack comprising a cylinder (13) communicating with the inside of pipe (1) at a first end, the cylinder being secured to elongate element (3), a mobile piston (11) secured to lock (9), sliding in the cylinder, and a blocking snug for blocking mobile piston (11) in its position of engaging in flexible element (6), that is calibrated to give way when the differential pressure applied to the piston of the jack is higher than a threshold value.

12. A system as claimed in claim 3, characterized in that unblocking means (10) include a hydraulic jack comprising a cylinder (13) communicating with the inside of pipe (1) at a first end, the cylinder being secured to elongate element (3), a mobile piston (11) secured to lock (9), sliding in the cylinder, and a blocking snug for blocking mobile piston (11) in its position of engaging in flexible element (6), that is calibrated to give way when the differential pressure applied to the piston of the jack is higher than a threshold value.

13. A system as claimed in claim 4, characterized in that unblocking means (10) include a hydraulic jack comprising a cylinder (13) communicating with the inside of pipe (1) at a first end, the cylinder being secured to elongate element (3), a mobile piston (11) secured to lock (9), sliding in the cylinder, and a blocking snug for blocking mobile piston (11) in its position of engaging in flexible element (6), that is calibrated to give way when the differential pressure applied to the piston of the jack is higher than a threshold value.

14. A system as claimed in claim 2, characterized in that unblocking means (10) include a hydraulic jack comprising a cylinder (13) communicating with the inside of pipe (1) at one end, the cylinder being secured to elongate element (3), a mobile piston (11) secured to lock (9), sliding in cylinder (13), which communicates with the inside of the pipe through a valve calibrated to open when the overpressure in pipe (1) reaches a determined threshold value.

15. A system as claimed in claim 3, characterized in that unblocking means (10) include a hydraulic jack comprising a cylinder (13) communicating with the inside of pipe (1) at one end, the cylinder being secured to elongate element (3), a mobile piston (11) secured to lock (9), sliding in cylinder (13), which communicates with the inside of the pipe through a valve calibrated to open when the overpressure in pipe (1) reaches a determined threshold value.

16. A system as claimed in claim 4, characterized in that unblocking means (10) include a hydraulic jack comprising a cylinder (13) communicating with the inside of pipe (1) at one end, the cylinder being secured to elongate element (3), a mobile piston (11) secured to lock (9), sliding in cylinder (13), which communicates with the inside of the pipe through a valve calibrated to open when the overpressure in pipe (1) reaches a determined threshold value.

17. A system as claimed in claim 2, characterized in that it comprises pumping means (P) intended to establish an overpressure.

18. A system as claimed in claim 3, characterized in that it comprises pumping means (P) intended to establish an overpressure.

19. A system as claimed in claim 4, characterized in that it comprises pumping means (P) intended to establish an overpressure.

20. A system as claimed in claim 5, characterized in that it comprises pumping means (P) intended to establish an overpres sure.

21. A system as claimed in claim 6, characterized in that it comprises pumping means (P) intended to establish an overpressure.

22. A system as claimed in claim 2, characterized in that elongate element (3) is a tubing suited for fluid circulation.

23. A system as claimed in claim 3, characterized in that elongate element (3) is a tubing suited for fluid circulation.

24. A system as claimed in claim 4, characterized in that elongate element (3) is a tubing suited for fluid circulation.

25. A system as claimed in claim 5, characterized in that elongate element (3) is a tubing suited for fluid circulation.

26. A system as claimed in claim 6, characterized in that elongate element (3) is a tubing suited for fluid circulation.

27. A system as claimed in claim 7, characterized in that elongate element (3) is a tubing suited for fluid circulation.

28. A system intended for installation of a series of seismic sondes (7) against the wall of a wellbore (1) drilled through an underground zone, and at a distance from one another, characterized in that it comprises an elongate support element (3), devices (2) for coupling each sonde, comprising each at least one flexible element (6) to which measuring sonde (7) is fastened, this flexible element being suited, in a stretched position, to press said sonde (7) against the wall of pipe (1), means (8–10) for locking flexible element (6) in a set back position at a distance from the wall of pipe (1), these locking means can be actuated by establishing an overpressure in wellbore (1), and means (L) for transmitting signals picked up by the various seismic sondes (7) to a surface recording station.

29. A system as claimed in claim 28, characterized in that the pressure means comprise a surface pumping installation (P) for establishing in the well a sufficient overpressure at the depth of installation of the various coupling devices, sufficient to cause breaking of blocking snugs (15) and to release locks (9).

30. A system as claimed in claim 28, characterized in that elongate element (3) is a tubing used for development of the underground zone.

31. A system as claimed in claim 28, characterized in that elongate element (3) is a tube that is taken up to the surface after installation of the various seismic sondes.

32. A system as claimed in claim 29, characterized in that elongate element (3) is a tubing used for development of the underground zone.

33. A system as claimed in claim 29, characterized in that elongate element (3) is a tube that is taken up to the surface after installation of the various seismic sondes.

* * * * *